United States Patent
Lo et al.

(10) Patent No.: US 9,945,370 B2
(45) Date of Patent: Apr. 17, 2018

(54) GAS COMPRESSION SYSTEM AND METHOD OF COMPRESSING GAS USING THE GAS COMPRESSION SYSTEM

(71) Applicant: Industrial Technology Research Institute, Hsinchu (TW)

(72) Inventors: Kai-Fan Lo, Kaohsiung (TW); Chien-Yun Huang, Hsinchu County (TW); Chien-Chang Hung, Pingtung County (TW); Fang-Hei Tsau, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 376 days.

(21) Appl. No.: 14/946,782

(22) Filed: Nov. 20, 2015

(65) Prior Publication Data

US 2017/0146000 A1    May 25, 2017

(51) Int. Cl.
*F04B 41/02*    (2006.01)
*F04B 37/18*    (2006.01)
(Continued)

(52) U.S. Cl.
CPC .............. *F04B 41/02* (2013.01); *B01D 53/04* (2013.01); *F04B 35/008* (2013.01); *F04B 37/18* (2013.01);
(Continued)

(58) Field of Classification Search
CPC ........ F04B 41/02; F04B 35/008; F04B 37/18; F04B 39/0005; F04B 39/06; F04B 39/12;
(Continued)

(56) References Cited

U.S. PATENT DOCUMENTS 2,354,383 A * 7/1944 Kiesskalt ............... B01D 51/10
                                                95/144
3,943,719 A    3/1976 Terry et al.
(Continued)

FOREIGN PATENT DOCUMENTS

CN    1789455    6/2006
CN    2864323    1/2007
(Continued)

OTHER PUBLICATIONS

"Office Action of Taiwan Counterpart Application," dated Oct. 7, 2016, p. 1-p. 5.
(Continued)

*Primary Examiner* — Dominick L Plakkoottam
*Assistant Examiner* — Benjamin Doyle
(74) *Attorney, Agent, or Firm* — JCIPRNET

(57) ABSTRACT

A gas compression system is provided. The gas compression system includes a compressor, an adsorption device, and a fluid control device. The compressor includes a first port and a second port. The adsorption device is adapted to output the high pressure hydrogen gas to the first port and absorb the low pressure hydrogen gas from the second port. The adsportion includes a first container connected to the first port or the second port, and a second container connected to the first port or the second port. The first container and the second container includes a hydrogen adsorption material adapted to release the high pressure hydrogen gas when heated, and absorb the low pressure hydrogen gas when cooled. A method of using the gas compression system is also provided.

26 Claims, 7 Drawing Sheets

(51) Int. Cl.
*F04B 39/00* (2006.01)
*F04B 39/06* (2006.01)
*F04B 39/12* (2006.01)
*F04B 53/10* (2006.01)
*B01D 53/04* (2006.01)
*F04B 35/00* (2006.01)

(52) U.S. Cl.
CPC .......... *F04B 39/0005* (2013.01); *F04B 39/06* (2013.01); *F04B 39/12* (2013.01); *F04B 39/123* (2013.01); *F04B 53/10* (2013.01); *Y02E 70/30* (2013.01)

(58) Field of Classification Search
CPC ........ F04B 39/123; F04B 53/10; B01D 53/04; F17C 11/00; F17C 11/005; Y02E 70/30
USPC ......... 417/379–389; 96/143, 144; 423/648.1, 423/658.2; 206/7
See application file for complete search history.

(56) References Cited

U.S. PATENT DOCUMENTS

| | | | | |
|---|---|---|---|---|
| 4,085,590 | A * | 4/1978 | Powell | F01K 25/00 34/416 |
| 4,385,494 | A * | 5/1983 | Golben | G12B 1/04 60/513 |
| 4,402,187 | A * | 9/1983 | Golben | F04B 37/02 123/DIG. 12 |
| 4,439,111 | A * | 3/1984 | Seidel | F03G 6/00 126/634 |
| 4,599,867 | A | 7/1986 | Retallick | |
| 4,884,953 | A * | 12/1989 | Golben | F03G 6/00 417/379 |
| 6,128,904 | A * | 10/2000 | Rosso, Jr. | F01K 25/00 60/649 |
| 6,551,066 | B2 | 4/2003 | Saylor et al. | |
| 6,695,061 | B2 * | 2/2004 | Fripp | E21B 23/04 166/187 |
| 6,824,710 | B2 | 11/2004 | Viteri et al. | |
| 8,114,363 | B1 * | 2/2012 | Golben | C10L 1/04 422/198 |
| 8,522,573 | B2 * | 9/2013 | Golben | C10L 1/04 422/129 |
| 2003/0032855 | A1 | 2/2003 | Shahinpoor | |
| 2009/0324431 | A1 * | 12/2009 | van Boeyen | F04B 19/24 417/379 |
| 2011/0302932 | A1 | 12/2011 | Hopkins | |
| 2012/0159970 | A1 | 6/2012 | Reese et al. | |
| 2013/0017109 | A1 | 1/2013 | Flenche | |
| 2013/0181162 | A1 | 7/2013 | Antonelli | |
| 2013/0315818 | A1 | 11/2013 | Roy | |
| 2015/0192017 | A1 * | 7/2015 | Quiros Morales | F15B 3/00 417/53 |
| 2017/0146000 | A1 * | 5/2017 | Lo | F04B 37/18 |

FOREIGN PATENT DOCUMENTS

| | | |
|---|---|---|
| CN | 101203719 | 6/2008 |
| JP | 2004211606 | 7/2004 |
| JP | 4432239 | 3/2010 |
| TW | 031203 | 7/1980 |
| TW | 357236 | 5/1999 |
| WO | 2014023961 | 2/2014 |

OTHER PUBLICATIONS

Nuchkrua et al., "Fuzzy Self-Tuning PID Control of Hydrogen-Driven Pneumatic Artificial Muscle Actuator", Journal of Bionic Engineering, Jul. 2013, pp. 329-340.

Bhuiya et al., "Metal hydrides in engineering systems, processes, and devices: A review of non-storage applications", International Journal of Hydrogen Energy, Feb. 9, 2015, pp. 2231-2247.

Kim et al., "Dynamic Characteristics of the SMH Actuator Using Hydrogen-Absorbing Alloys", Proc. SPIE 6042, ICMIT 2005: Control Systems and Robotics, May 2, 2006, pp. 60424J-1-60424J-6.

Nomura et al., Abstract of "A novel thermal engine using metal hydride", Energy Conversion, vol. 19, Issue 1, 1979, pp. 1.

Kurosaki et al., "Design and development of MH actuator system", Sensors and Actuators A, Jun. 15, 2004, pp. 118-123.

\* cited by examiner

GAS COMPRESSION SYSTEM AND METHOD OF COMPRESSING GAS USING THE GAS COMPRESSION SYSTEM

TECHNICAL FIELD

The technical field relates to a gas compression system and a method of compressing gas using the gas compression system.

BACKGROUND

Compressed gas has many applications such as in pneumatics, energy storage, vehicles, and many more. Industries that use automation equipment or automated systems require applications with compressed gas, such as pneumatic equipment.

Gas compression systems are used to raise the pressure of compressed gas. Currently, some pressure storage containers have the ability to store to around 875 bars of pressure. Generally, gas can be compressed up to 30 bars without requiring a great increase in cost and energy. However, to compress gas to exceed 30 bars of pressure, the cost and energy required greatly increases. Therefore, there is a great difference between the ability to store high pressure gas and easily compress high pressure gas.

SUMMARY

An exemplary embodiment of the disclosure provides a gas compression system including a compressor, an adsorption device, and a fluid control device. The compressor includes a pressurizing chamber having a first port and a second port. The first port is adapted for receiving a hydrogen gas and the second port is adapted for outputting the hydrogen gas. The adsorption device is adapted to output the hydrogen gas to the first port and absorb the hydrogen gas from the second port. The adsportion device includes a first container connected to the first port or the second port of the pressurizing chamber and a second container connected to the first port or the second port of the pressurizing chamber. The first container includes a hydrogen adsorption material the second container includes the hydrogen adsorption material. The hydrogen adsorption material of the first container and the second container is adapted to release the hydrogen gas when heated, and absorb the hydrogen gas when cooled. The fluid control device is adapted to provide one of a first fluid and a second fluid to the first container and the other one of the first fluid and the second fluid to the second container. A temperature of the first fluid is greater than a temperature of the second fluid.

An exemplary embodiment of the disclosure provides a method of compressing gas by using a gas compression system. The gas compression system includes a compressor, a fluid control device, a first container with a hydrogen adsorption material, and a second container with the hydrogen adsorption material. The method includes the following steps. In step (a), a first fluid is provided to the first container to heat the hydrogen adsorption material of the first container and a second fluid is provided to the second container with the hydrogen adsorption material to cool the hydrogen adsorption material of the second container through the fluid control device. A temperature of the first fluid is greater than a temperature of the second fluid, and the hydrogen adsorption material is adapted to release a hydrogen gas when heated and absorb the hydrogen gas when cooled. Then, in step (b), a first port of the compressor is opened to receive the hydrogen gas released from the first container to push a piston for compression. Next, in step (c), the first port of the compressor is closed and a second port of the compressor is opened to output the hydrogen gas. Next, in step (d), the hydrogen gas from the second port of the compressor is absorbed by the second container, and the second port is closed after the hydrogen gas is absorbed. Next, in step (e), if a hydrogen pressure of the first container is not lower than a first predetermined threshold, step (b) to step (d) are repeated. Next, in step (f), when the hydrogen pressure of the first container is lower than the first predetermined threshold, the second fluid is provided to the first container to cool the hydrogen adsorption material of the first container and the first fluid is provided to the second container to heat the hydrogen adsorption material of the second container. Next, in step (g), the first container absorbs the hydrogen gas released from the second container until the hydrogen pressure of the first container is higher than the second predetermined threshold. Next, in step (h), step (a) to step (h) are repeated.

An exemplary embodiment of the disclosure provides a method of compressing gas by using a gas compression system. The gas compression system includes a compressor, a fluid control device, a first container with a hydrogen adsorption material, and a second container with the hydrogen adsorption material. The method includes the following steps. In step (a), a first fluid is provided to the first container to heat the hydrogen adsorption material of the first container and a second fluid is provided to the second container with the hydrogen adsorption material to cool the hydrogen adsorption material of the second container through the fluid control device. A temperature of the first fluid is greater than a temperature of the second fluid, and the hydrogen adsorption material is adapted to release a hydrogen gas when heated and absorb the hydrogen gas when cooled. Next, in step (b), a first port of a compressor is opened to receive the hydrogen gas released from the first container to push a piston for compression. Next, in step (c), the first port of the compressor is closed and a second port of the compressor is opened to output the hydrogen gas. Next, in step (d), the hydrogen gas from the second port of the compressor is absorbed by the second container, and the second port is closed after the hydrogen gas is absorbed. Next, in step (e), if a hydrogen pressure of the first container is not lower than a first predetermined threshold, step (b) to step (d) are repeated. Next, in step (f), when a hydrogen pressure of the first container is lower than the first predetermined threshold, the second fluid is provided to the first container to cool the hydrogen adsorption material of the first container and the first fluid is provided to the second container to heat the hydrogen adsorption material of the second container. Next, in step (g), the first port of a compressor is opened to receive the hydrogen gas outputted from the second container to push the piston for compression. Next, in step (h), the first port of the compressor is closed and the second port of the compressor is opened to output the hydrogen gas. Next, in step (i), the hydrogen gas from the second port of the compressor is absorbed by the first container, the second port is closed after the low pressure hydrogen gas is absorbed. Next, in step (j), if a hydrogen pressure of the second container is not lower than a second predetermined threshold, step (g) to step (i) are repeated. Next, in step (k) when the hydrogen pressure of the second container is lower than the second predetermined threshold, the method returns to step (a) and repeats step (a) to step (k).

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
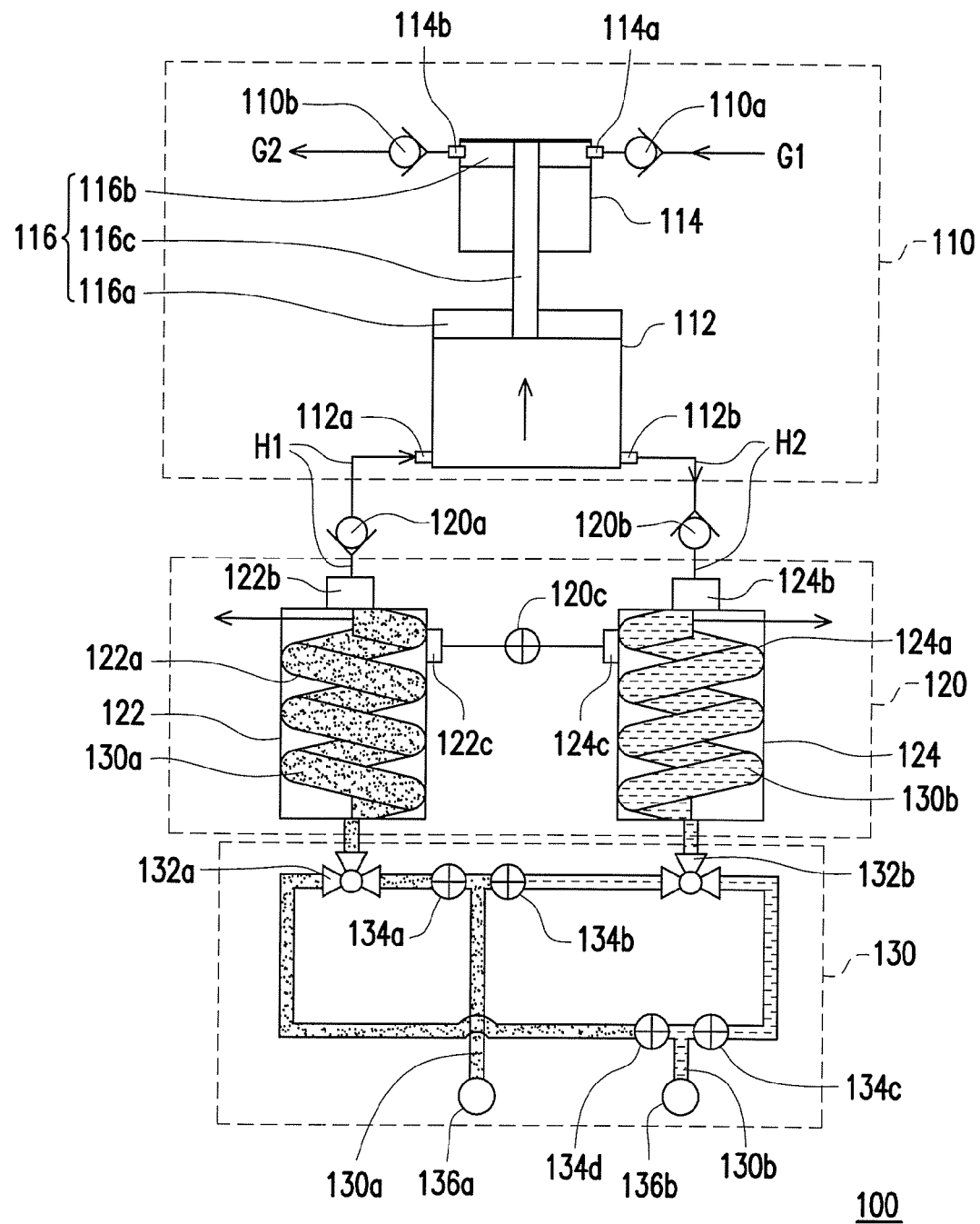
FIG. 1 is a schematic diagram illustrating a gas compression system according to an exemplary embodiment.

FIG. 1 is a schematic diagram illustrating a gas compression system according to an exemplary embodiment. The gas compression system 100 of FIG. 1 includes a compressor 110, an adsorption device 120, and a fluid control device 130.

The fluid control device 130 is adapted to provide from a first fluid 130a from a first fluid source 136a and a second fluid 130b from a second fluid source 136b. In the embodiment, a temperature of the first fluid 130a is greater than a temperature of the second fluid 130b. The first fluid 130a and the second fluid 130b may be any type of fluid that is liquid of gas. In the embodiment, the first fluid 130a is, for example, hot water, and the second fluid 130b is, for example, cold water. However, the disclosure is not limited thereto. One of ordinary skill in the art may use any suitable type of fluid as the first fluid 130a and the second fluid 130b. For example, the first fluid 130a and the second fluid 130b may be hot or cold wastewater or excess fluid that may be utilized in the gas compression system 100. This the gas compression system 100 may serve as a means to recycle the wastewater or excess fluid.

In the embodiment, the fluid control device 130 includes a three way valve 132a and a three way valve 132b. The fluid control device 130 also includes four on-off valves 134a, 134b, 134c, and 134d. The on-off valve 134a is disposed on a fluid flow path between the first fluid source 136a and a port of the three way valve 132a. The on-off valve 134d is disposed on a fluid flow path between the second fluid source 136b and another port of the three way valve 132a. The on-off valve 134c is disposed on a fluid flow path between the second fluid source 136b and a port of the three way valve 132b. The on-off valve 134b is disposed on a fluid flow path between the first fluid source 136a and another port of the three way valve 132b. By opening and closing the on-off valves 134a, 134b, 134c, and 134d, the fluid control device 130 may control whether the first fluid 130a or the second fluid 130b flows to the three way valves 132a, 132b. The fluid flow paths may be, for example, tubes or pipes that allow fluid to flow through. One of ordinary skill in the art may use any suitable means as fluid flow paths for the first fluid 130a and the second fluid 130b to flow through.

The adsorption device 120 includes a first container 122 and a second container 124. Each of the first container 122 and the second container 124 contain a hydrogen adsorption material. The hydrogen adsorption material may be, for example, a metal hydride material. The hydrogen adsorption material may be a combination of a first material and a second material. The first material may be, for example, titanium, lanthanum, magnesium, strontium, lithium, chromium, iridium, calcium, or palladium. The second material may be, for example, silver, nickel, gold, platinum, copper, cobalt, aluminium, iron, vanadium, manganese, or arsenic. However, the invention is not limited thereto, and the hydrogen adsorption material may be any material known to one of ordinary skill in the art. The hydrogen adsorption material may release pressurized hydrogen gas that is varied by temperature. For example, at room temperature (around 25 degrees Celsius), the hydrogen adsorption material can release pressurized hydrogen of around 1-3 bars of pressure. At around, for example, 60 degrees Celsius, the hydrogen adsorption material may constantly release pressurized hydrogen of around 20 bars of pressure until all the hydrogen gas is released. At 100 degrees Celsius, the hydrogen adsorption material may constantly release pressurized hydrogen of around 30 bars of pressure. Another characteristic of the hydrogen adsorption material is that at a low temperature, the hydrogen adsorption material may absorb hydrogen gas. The hydrogen adsorption material is the same in the first container 122 and the second container 124. However, the disclosure is not limited thereto. One of ordinary skill in the art may use different types of hydrogen adsorption material in the first container 122 and the second container 124 if suitable.

That is to say, the hydrogen adsorption material in each of the first container 122 and the second container 124 is adapted to release the high pressure hydrogen gas H1 when heated, and absorb the low pressure hydrogen gas H2 when cooled. The hydrogen adsorption material in the container with a higher temperature releases high pressure hydrogen gas H1 and the hydrogen adsorption material in the container with the lower temperature absorbs the hydrogen gas.

The first container 122 includes a heat exchanger 122a and the second container 124 includes a heat exchanger 124a. The heat exchanger 122a is connected to the three way valve 132a so that the first fluid 130a or the second fluid 130b flowing through the three way valve 132a flows through the heat exchanger 122a. The heat exchanger 124a is connected to the three way valve 132b so that the first fluid 130a or the second fluid 130b flowing through the three way valve 132b flows through the heat exchanger 124a. This way, the heat exchangers 122a, 124a may respectively control a temperature of the first container 122 and the second container 124. In the embodiment, the fluid flows through an input and an output of the heat exchangers 122a, 124a (arrows in FIG. 1 from the heat exchangers 122a, 124a show the fluid being outputted) without making direct contact with the hydrogen adsorption material. However, the disclosure is not limited thereto. One of ordinary skill in the art may apply any suitable type of heat exchanger to control the temperature of the first container 122 and the second container 124 through the first fluid 130a and the second fluid 130b.

The compressor 110 includes a pressurizing chamber 112 and a compression chamber 114. The pressurizing chamber 112 includes a first port 112a and a second port 112b. The first port 112a is adapted for receiving the high pressure hydrogen gas H1 released from the first container 122. The second port 112b is adapted for outputting a low pressure hydrogen gas H2.

The compression chamber 114 includes a third port 114a for low pressure gas G1 to enter and be compressed and a fourth port 114b through which a compressed gas G2 is discharged. The low pressure gas G1 may be any type of gas that a user wants to compress, and is not limited to a specific gas. The low pressure gas G1 may enter the compression chamber 114 through a one way valve 110a connected to the third port 114a. The one way valve 110a allows the low pressure gas G1 to flow toward the third port 114a and blocks the low pressure gas G1 from flowing back to the source of the low pressure gas G1. That is to say, the one way valve 110a only allows gas to flow in the direction towards the third port 114a. The compressed gas G2 may be discharged through a one way valve 110b connected to the fourth port 114b. That is to say, once the low pressure gas G1 is compressed and the fourth port 114b is opened, the compressed gas G2 may be discharged by flowing through the one way valve 110b. The one way valve 110b allows the compressed gas G2 to flow through but blocks the compressed gas G2 from flowing back to the fourth port 110b. That is to say, the one way valve 110b only allows gas to flow in the direction away from the fourth port 114b. However, the invention is not limited thereto. The one way valves 110a, 110b may be omitted. Or, other components may be used to provide the low pressure gas G1 to the third port 114a and discharge the compressed gas G2 from the fourth port 114b.

The compressor 110 further includes a piston 116 having a first end 116a and a second end 116b. The first end 116a of the piston 116 is slidably mounted in the pressurizing chamber 112 and the second end 116b of the piston 116 is slidably mounted in the compression chamber 114. The first end 116a and the second end 116b of the piston 116 are respectively mounted in the pressurizing chamber 112 and the compression chamber 114 to be gas tight. The first end 116a and the second end 116b are connected together by a shaft 116c. In the embodiment, a surface area of the first end 116a of the piston 116 is greater than a surface area of the second end 116b of the piston.

The compression system 100 includes a one way valve 120a disposed on a fluid flow path between an inlet/outlet 122b of the first container 122 and the first port 112a of the pressurizing chamber 112. The compression system 100 also includes a one way valve 120b disposed on a fluid flow path between an inlet/outlet 124b of the second container 124 and the second port 112b of the pressurizing chamber 112.

In FIG. 1, the on-off valve 134a is opened and the on-off valve 134b is closed. The first fluid 130a is provided to the heat exchanger 122a through the three way valve 132a to heat the hydrogen adsorption material in the first container 122. As a result, the first container 122 is in a high temperature and high pressure state, and the hydrogen adsorption material of the first container 122 releases high pressure hydrogen gas H1. The high pressure hydrogen gas H1 flows from the inlet/outlet 122b of the first container 122 to the first port 112a of the pressurizing chamber 112 through the one way valve 120a. The one way valve 120a allows the high pressure hydrogen gas H1 to flow through towards the first port 112a, and block the high pressure hydrogen gas H1 from flowing back to the inlet/outlet 122b of the first container 122. The on-off valve 134c is opened and the on-off valve 134d is closed so that the second fluid 130b flows to the heat exchanger 124a through the three way valve 132b to cool the hydrogen adsorption material in the second container 124.

Figure 2:
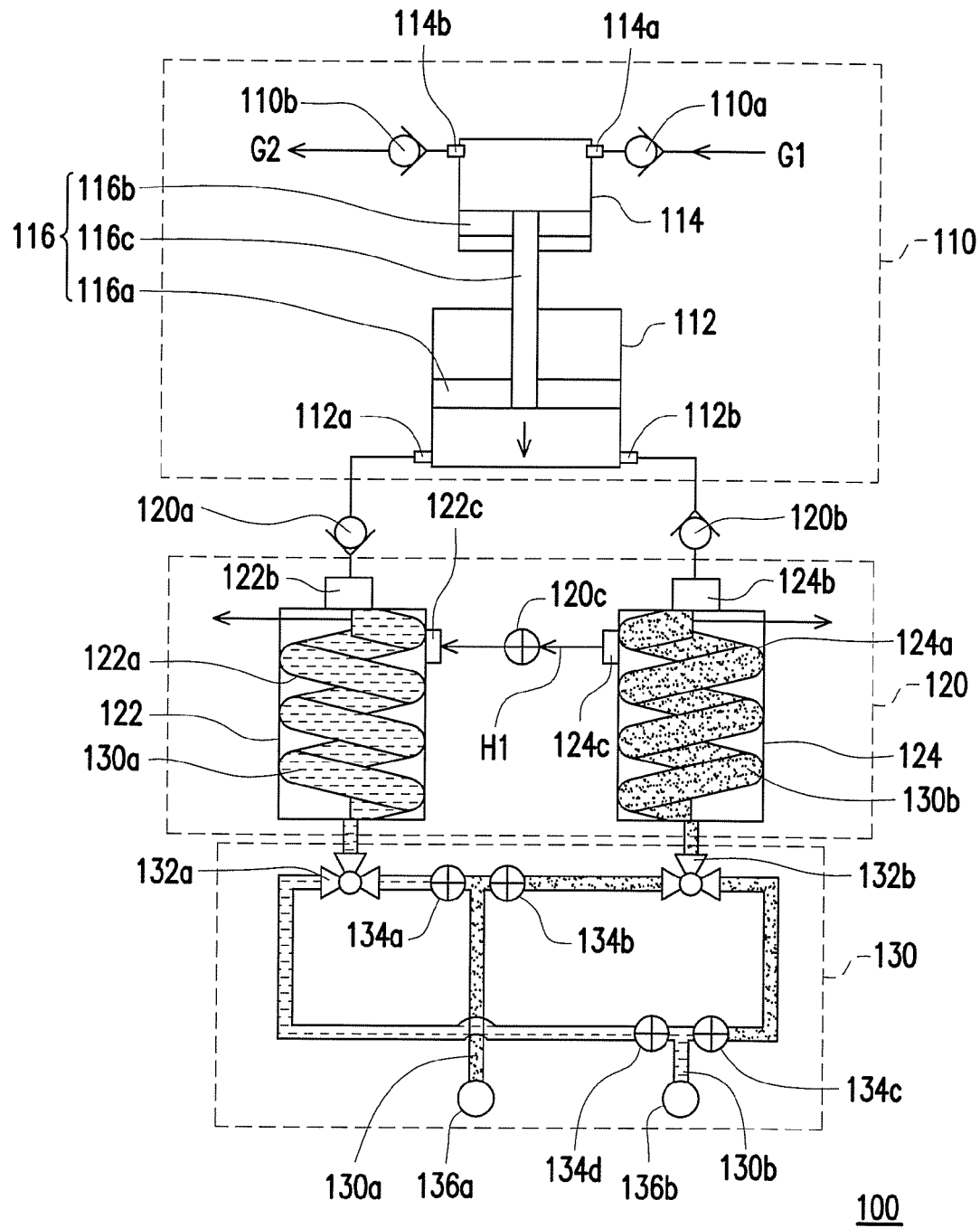
FIG. 2 is a schematic diagram illustrating the gas compression system of FIG. 1 under a different status.

As the high pressure hydrogen gas H1 flows into the pressurizing chamber 112 through the first port 112a, the first end 116a of the piston 116 is pushed by the high pressure hydrogen gas H1 since the piston 116 is gas tight. The first end 116a of the piston 116 is connected to the second end 116b through the shaft 116c, and as the first end 116a is pushed, for example, upwards away from the first port 112a and the second port 112b, the second end 116b is also pushed towards the third port 114a and the fourth port 114b of the compression chamber 114. The third port 114a opens to allow low pressure gas G1 to enter. Then the third port 114a is closed, and the second end 116b of the piston compresses the low pressure gas G1 in the compression chamber 114. The fourth port 114b is then opened to discharge the compressed gas G2. To discharge the compressed gas G2, the second end 116b of the piston 116 is pushed to the end of the compression chamber 114 as shown in FIG. 1. The arrow in the pressurizing chamber 112 of FIG. 1 shows the piston 116 being pushed up by the high pressure hydrogen gas H1. When the second end 116b of the piston 116 is pushed to the end of the compression chamber 114, the first port 112a is closed and the high pressure hydrogen gas H1 may become the low pressure hydrogen gas H2 due to the volume changing from the piston 116 being pushed up. However, the high pressure hydrogen gas H1 may still be at a high pressure. For descriptive purposes, the high pressure hydrogen gas H1 becomes the low pressure gas H2 in the embodiment only as an example. The second port 112b is then opened and the low pressure hydrogen gas H2 flows through the one way valve 120b to the inlet/outlet 124b of the second container 124. As described above, the second fluid 130b flows through the heat exchanger 124a of the second container 124 to cool the hydrogen adsorption material in the second container 124. Therefore, the second container 124 is in a low temperature and low pressure state. Thus, the hydrogen adsorption material in the second container 124 is adapted to absorb hydrogen gas. The low pressure hydrogen gas H2 flows through the inlet/outlet 124b of the second container 124 and is absorbed by the hydrogen adsorption material in the second container 124. The one way valve 120b allows the low pressure hydrogen gas H2 to flow through and blocks the low pressure hydrogen gas H2 from flowing back to the second port 112b. When the low pressure hydrogen gas H2 flows out of the second port 112b, the piston 116 slides back down to its initial state (for example as shown in FIG. 2, the arrow point down meaning the piston 116 slides back down). Then, the first port 112a is opened and the second port 112b is closed to repeat the process of driving the piston 116 to compress low pressure gas G1.

In the embodiment, it can be seen that the high pressure hydrogen gas H1 released from the first container 122 drives the piston to compress the low pressure gas G1 in the compression chamber 114. The pressure of the compressed gas G2 that is discharged from the fourth port 114b depends on the pressure of the high pressure hydrogen gas H1 released from the first container 122. That is to say, as the temperature of the first fluid 130a is greater, the pressure of the high pressure hydrogen gas H1 released from the first container 122 is greater. As a result, the pressure of the compressed gas G2 is also greater as the temperature of the first fluid 130a is greater. As described above, the first fluid 130a may be wastewater or excess fluid as a result of other processes. The temperature of these fluids may not be extreme enough for other processes, but may be utilized in the gas compression system 100. As long as the fluids have a temperature difference, the gas compression system 100 may be utilized so that one container releases hydrogen gas and the other container absorbs hydrogen gas.

In addition, the ratio between the surface area of the first end 116a and the surface area of the second end 116b will affect the pressure of the compressed gas G2. The relationship between the pressure and the surface area can be defined in the following formula: $F = P1 \times A1 = P2 \times A2$.

In the formula, F represents force, P1 represents the pressure of the high pressure hydrogen gas H1, A1 represents the surface area of the first end 116a, P2 represents the pressure of the compressed gas G2, and A2 represents the surface area of the second end 116b. It can be seen that as the surface area A1 is greater and the surface area A2 is smaller, the pressure P2 will be greater. Through the design of the piston 116 as well as the temperature of the first fluid 130a, the user may obtain a desired pressure of the compressed gas G2. As described above, for example, at 60 degrees Celsius, the hydrogen adsorption material may constantly release pressurized hydrogen of around 20 bars of pressure. With the surface area of the first end 116a being greater than the surface area of the second end 116b, the pressure may be multiplied depending on the ratio between the surface area of the first end 116a and the surface area of the second end 116b. Thus, the compressed gas G2 may easily be compressed past 30 bars of pressure without requiring a great increase in cost and energy.

In the embodiment, the adsportion device 120 further includes an on-off valve 120c disposed on a fluid flow path between an opening 122c of the first container 122 and an opening 124c of the second container 124. In the status of FIG. 1, the on-off valve 120c is closed so that no gas flows between the first container 122 and the second container 124. As described above, FIG. 1 shows the gas compression system 100 in a status of performing a gas compression process.

FIG. 2 is a schematic diagram illustrating the gas compression system of FIG. 1 under a different status. As the high pressure hydrogen gas H1 is released from the first container 122, the pressure state of the hydrogen gas (or a hydrogen pressure) in the first container 122 is reduced. In FIG. 2, the pressure state of the hydrogen gas (or a hydrogen pressure) in the first container 122 is lower than a predetermined threshold. The position of the piston 116 in FIG. 2 is only exemplary, and can be in any position when the pressure state of the hydrogen gas in the first container 122 becomes lower than a predetermined threshold. FIG. 2 shows the gas compression system 100 in a regeneration process because the pressure state of the hydrogen gas in the first container 122 is lower than a first predetermined threshold.

In FIG. 2, the on-off valve 134b is opened and the on-off valve 134a is closed so that the first fluid 130a from the first fluid source 136a is provided to the three way valve 132b. The on-off valve 134c is closed and the on-off valve 134d is opened so that the second fluid 130b from the second fluid source 136b is provided to the three way valve 132a. That is to say, the first fluid 130a is provided to the heat exchanger 124a of the second container 124 and the second fluid 130b is provided to the heat exchanger 122a of the first container 122. Thus, the temperature of the second container 124 is greater than the temperature of the first container 122.

The second container 124 is in a high temperature and a high pressure state, and the hydrogen adsorption material in the second container 124 is adapted to release high pressure hydrogen gas H1. The one way valve 120b blocks the high pressure hydrogen gas H1 released from the inlet/outlet 124b from flowing to the second port 112b. In the status of FIG. 2, the on-off valve 120c is opened, and so gas may flow through the first container 122 and the second container 124. The first container 122 is in a low pressure state from being cooled by the second fluid 130b. Therefore, the hydrogen adsorption material in the first container 122 is adapted to absorb hydrogen gas. As a result, the high pressure hydrogen gas H1 released from the second container 124 will flow through the on-off valve 120c to the first container in a low pressure state. The hydrogen adsorption material in the first container 122 is then adapted to absorb the hydrogen gas released from the second container 124. The high pressure hydrogen gas H1 released from the second container 124 continues to flow and be absorbed by the hydrogen adsorption material of the first container 122 until the pressure state of the first container 122 is higher than a second predetermined threshold. In the embodiment, the high pressure hydrogen gas H1 released from the second container 124 continues to flow and be absorbed by the hydrogen adsorption material of the first container 122 until the pressure state of the first container 122 is the same as the pressure state of the second container 124. Once the pressure states of the first container 122 and the second container 124 are the same, or the pressure state of the first container 122 is higher than the second predetermined threshold, the regeneration process is complete, and the on-off valve 120c is closed. The gas compression process as described in FIG. 1 may then be repeated again to compress gas.

Figure 3:
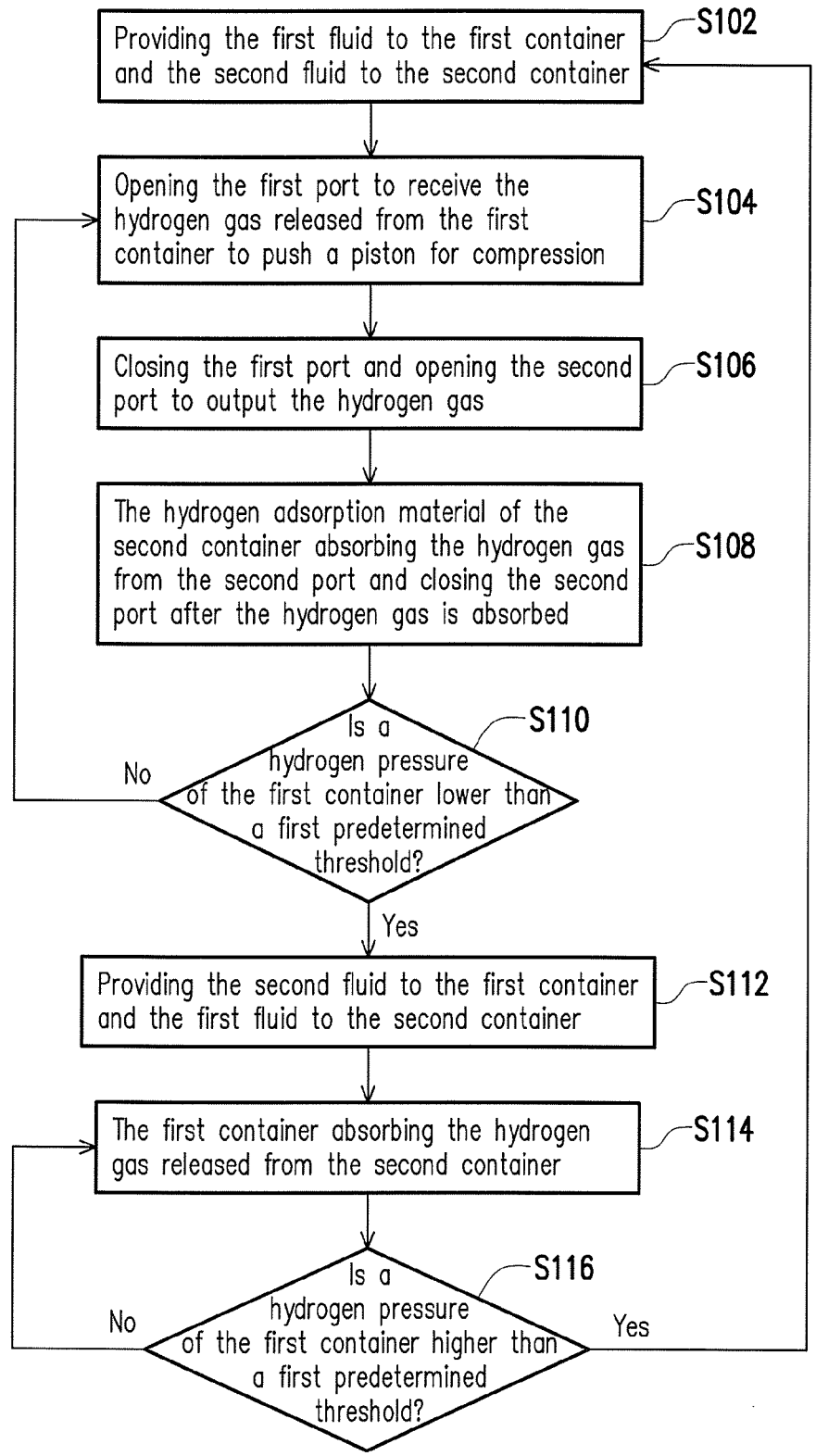
FIG. 3 is a flow chart of a method of compressing gas using the gas compression system of FIG. 1.

FIG. 3 is a flow chart of a method of compressing gas using the gas compression system of FIG. 1. The method of compressing gas by using the gas compression system 100 includes the following steps. The first fluid 130a is provided to the first container 122 to heat the hydrogen adsorption material of the first container 122 and the second fluid 130b is provided to the second container 124 with the hydrogen adsorption material to cool the hydrogen adsorption material of the second container 124 through the fluid control device 130 (step S102). The detail of how the first fluid 130a and the second fluid 130b are provided are described above, and will not be repeated therein. Furthermore, as described above, the first container 122 is then adapted to release high pressure hydrogen gas H1. Next, the first port 112a of the pressurizing chamber 112 is opened to receive the high pressure hydrogen gas H1 released from the first container 122 to push a piston 116 for compression (step S104). The detail of how gas is compressed by the piston 116 is described above, and will not be repeated herein. Next, the first port 112a is closed and the second port 112b is opened to output the low pressure hydrogen gas (step S106). Next, the low pressure hydrogen gas H2 from the second port 112b is absorbed by the hydrogen adsorption material of the second container 124, and the second port 112b is closed after the low pressure hydrogen gas H2 is absorbed (step S108). Next, it is determined if the hydrogen pressure of the first container 122 is lower than a first predetermined threshold (step S110). If the hydrogen pressure of the first container 122 is not lower than a first predetermined threshold, then step S104 to step S108 are repeated to drive the piston 116 to continuously compress the low pressure gas G1 into the high pressure gas G2. When a hydrogen pressure of the first container 122 is lower than a first predetermined threshold, the second fluid 130b is provided to the first container 122 to cool the hydrogen adsorption material of the first container 122 and the first fluid 130a is provided to the second container 124 to heat the hydrogen adsorption material of the second container 124 (step S112). The detail description of step S110 can be referred to in the description in FIG. 2, and will not be repeated herein. Next, the first container 122 absorbs the high pressure hydrogen gas H1 released from the second container 124 (step S114). Next, it is determined if the hydrogen pressure of the first container 122 is higher than a second predetermined threshold (step S116). If the hydrogen pressure of the first container 122 is not higher than a second predetermined threshold, then step S114 is repeated. If the hydrogen pressure of the first container 122 is higher than a second predetermined threshold, the process returns to step S102 to repeat the process from step S102 to step S112.

Figure 4:
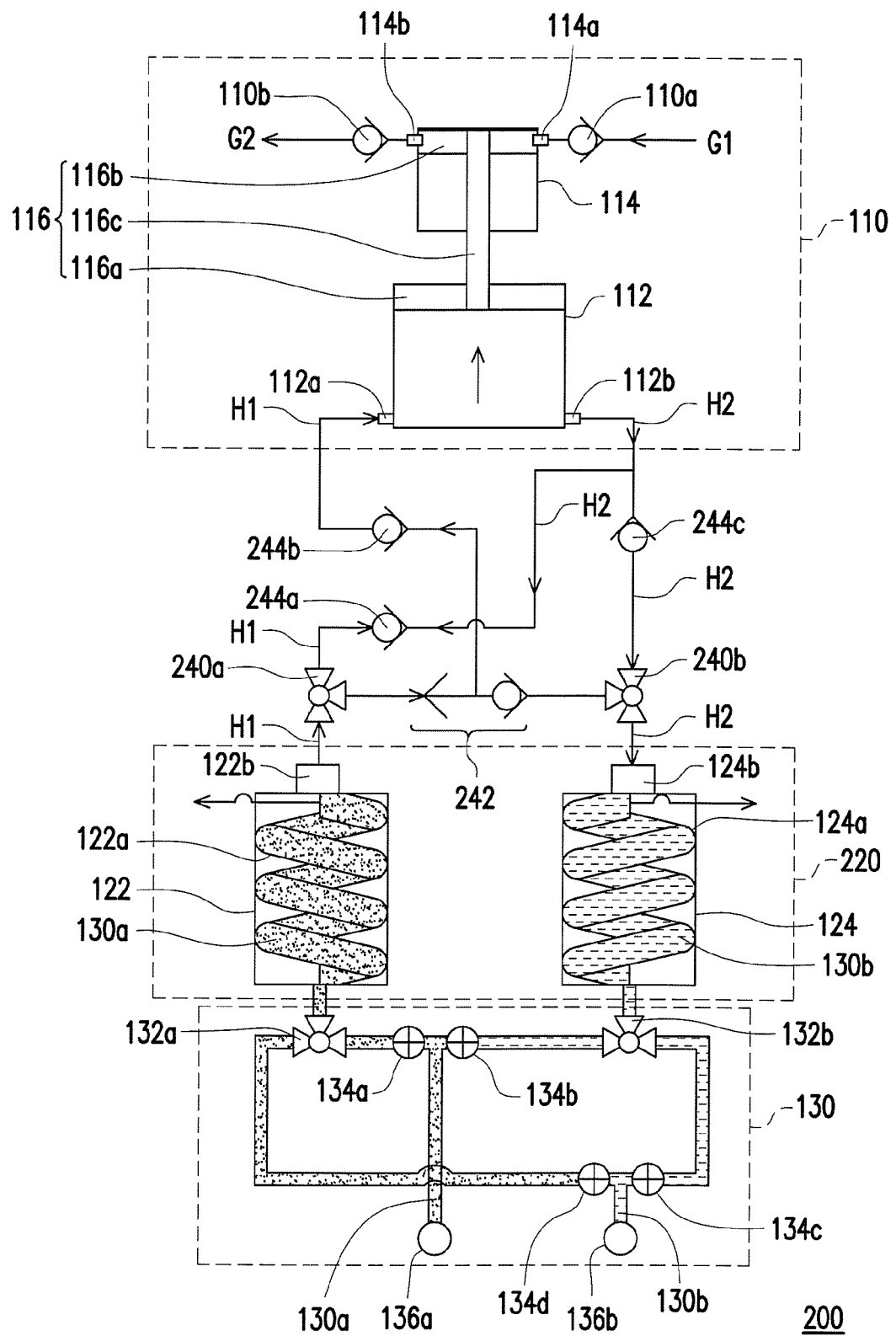
FIG. 4 is a schematic diagram illustrating a gas compression system according to another exemplary embodiment.

FIG. 4 is a schematic diagram illustrating a gas compression system according to another exemplary embodiment. In the gas compression system 200 of FIG. 4, similar elements with the gas compression system 100 of FIG. 1 will have the same or similar reference numerals. Specifically, the compressor 110 and the fluid control device 130 in FIG. 4 are the same as FIG. 1. Similar description will not be repeated herein. The adsorption device 220 of FIG. 4 is similar to the adsorption device 120 of FIG. 1 except the adsorption device 220 of FIG. 4 does not include the on-off valve 120c and the openings 122c, 124c. In addition, the difference in the gas compression system 200 of FIG. 4 is that it does not include the one way valve 120a and the one way valve 120b of the gas compressor 100 in FIG. 1 as a fluid flow connection between the compressor 110 and the adsorption device 120. In the embodiment of FIG. 4, the gas compression system 200 includes two three way valves 240a, 240b, a shuttle valve 242, and three one way valves 244a, 244b, 244c.

The three way valve 240a is connected to an inlet/outlet 122b of the first container 122. The three way valve 240b is connected to an inlet/outlet 124b of the second container 124. The shuttle valve 242 is disposed on a fluid flow path between the three way valve 240a, the three way valve 240b, and the first port 112a. The shuttle valve 242 blocks fluid from passing between the three way valve 240a and the three way valve 240b, and allows fluid to pass between the three way valve 240a and the first port 112a or the three way valve 240b and the first port 112a. The one way valve 244a is disposed on a fluid flow path between the three way valve 240a and the second port 112b. The one way valve 244b is disposed on a fluid flow path between the shuttle valve 242 and the first port 112a. The one way valve 244c is disposed on a fluid flow path between the three way valve 240b and the second port 112b.

FIG. 4 shows the gas compression system 200 performing a gas compression process. The first fluid 130a is provided to the first container 122 and the second fluid 130b is provided to the second container 124. The detailed description of the fluid control device 130, the adsorption device 220, and the compressor 110 is the same as the embodiment of FIG. 1, and will not be repeated herein.

In the embodiment, the high pressure hydrogen gas H1 released from the first container 122 flows to the three way valve 240a. The three way valve 240a allows the high pressure hydrogen gas H1 to flow through and is blocked by the one way valve 244a from flowing to the second port 112b. The high pressure hydrogen gas H1 also flows to the shuttle valve 242 and is blocked by the shuttle valve 242 from flowing to the three way valve 240b. The shuttle valve 242 allows the high pressure hydrogen gas H1 to pass through and flow to the one way valve 244b. The one way valve 244b allows the high pressure hydrogen gas H1 to pass through and flow into the first port 112a, and blocks the high pressure hydrogen gas H1 from flowing back to the three way valve 240a. The first port 112a is opened for the high pressure hydrogen gas H1 to flow in to the pressurizing chamber 112 and push the piston 116. The piston 116 is then driven to compress the low pressure gas G1. The process of the piston 116 compress the low pressure gas G1 can be referred to in the description of FIG. 1, and will not be repeated herein.

The first port 112a is closed and the second port 112b is opened, and the low pressure hydrogen gas H2 outputted from the second port 112b flows to the three way valve 240b through the one way valve 244c, and is blocked by the one way valve 244c from flowing back to the second port 112b. The low pressure hydrogen gas H2 outputted from the second port 112b also flows to the one way valve 244a. However, because a blocking valve or ball of the one way valve 244a is pushed by the high pressure hydrogen gas H1, the low pressure hydrogen gas H2 is unable to flow through the one way valve 244a to the three way valve 240a. The low pressure hydrogen gas H2 outputted from the second port 112b flows to the three way valve 240b, and is output by the three way valve 240b to the shuttle valve 242. A blocking valve or ball of the shuttle valve 242 is pushed by the high pressure hydrogen gas H1, and the low pressure hydrogen gas H2 is unable to flow through the shuttle valve 242. The low pressure hydrogen gas H2 that flows to the three way valve 240b also flows to the inlet/outlet 124b of the second container 124, and is absorbed by the hydrogen adsorption material of the second container 124. This process is repeated through opening and closing the ports 112a, 112b, 114a, 114b to allow the piston 116 to continuously compress the low pressure gas G1 and discharge the compressed gas G2.

In the disclosure, the one way valves and the shuttle valve may include a blocking valve or ball, so as to allow or block fluid flow. However, the disclosure is not limited thereto. One of ordinary skill in the art may use any type of one way valve or shuttle valve that is suitable. In addition, the three way valves and the on-off valves may be any suitable type of valves.

Figure 5:
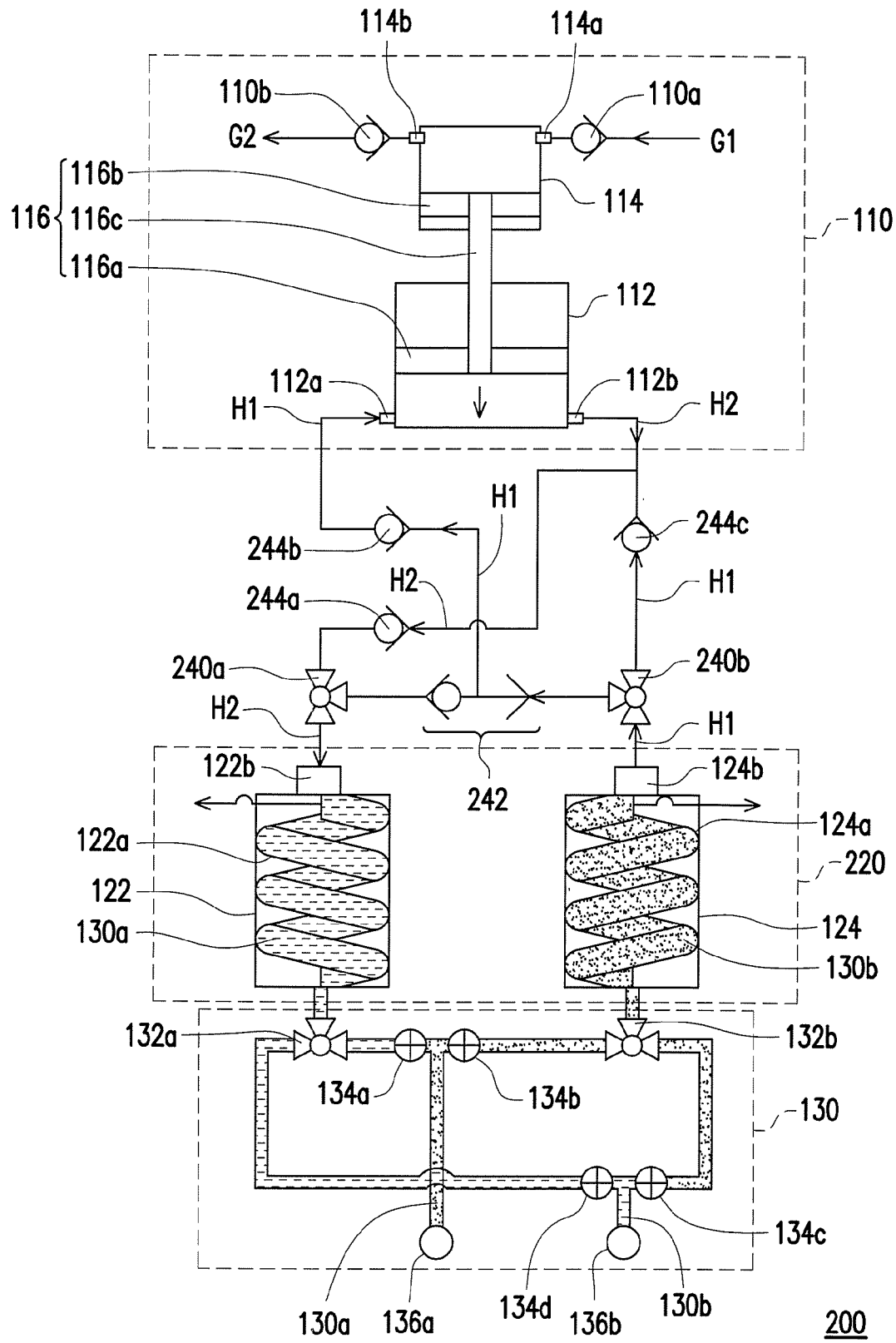
FIG. 5 is a schematic diagram illustrating the gas compression system of FIG. 4 under a different status.

FIG. 5 is a schematic diagram illustrating the gas compression system of FIG. 4 under a different status. The gas compression system 200 in FIG. 5 is also performing a gas compression process. In the embodiment, as the high pressure hydrogen gas H1 is released from the first container 122, the pressure state of the hydrogen gas in the first container 122 is reduced. In FIG. 5, the pressure state of the hydrogen gas in the first container 122 is lower than a predetermined threshold. When the pressure state of the hydrogen gas in the first container 122 is lower than a predetermined threshold, the gas compression system 200 performs a gas compression process according to FIG. 5.

In detail, the first fluid 130a is provided to the second container 124 and the second fluid 130b is provided to the first container 122. The detailed description of the fluid control device 130 and the compressor 110 is the same as the embodiment of FIG. 2, and will not be repeated herein.

In the embodiment, the second container 124 is heated by the first fluid 130a and releases high pressure hydrogen gas H1. The high pressure hydrogen gas H1 flows through the three way valve 240b and is blocked by the one way valve 244c from entering the second port 112b. The high pressure hydrogen gas H1 also flows from the three way valve 240b to the shuttle valve 242 to push the blocking valve or ball of the shuttle valve. The blocking valve or ball of the shuttle valve 242 blocks the high pressure hydrogen gas H1 from flowing to the three way valve 240a. The shuttle valve 242 allows the high pressure hydrogen gas H1 to flow through to the first port 112a through the one way valve 244b. The first port 112a is opened for the high pressure hydrogen gas H1 to flow into the pressurizing chamber 112 and drive the piston 116 to compress the low pressure gas G1.

The first port 112a is closed and the second port 112b is opened for the low pressure hydrogen gas H2 to be released. The low pressure hydrogen gas H2 flows to the one way valve 244c. A blocking valve or ball of the one way valve 244c is pushed by the high pressure hydrogen gas H1 from the second container 124, and the low pressure hydrogen gas H2 is unable to flow through the one way valve 244c. The low pressure hydrogen gas H2 flows through the one way valve 244a and to the three way valve 240a. Thus, the low pressure hydrogen gas H2 passes through the three way valve 240a and flows to the inlet/outlet 122b of the first container 122. Since the first container 122 is cooled by the second fluid 130b, the hydrogen adsorption material in the first container 122 is adapted to absorb the low pressure hydrogen gas H2. The low pressure hydrogen gas H2 also flows to the shuttle valve 242. The blocking valve or ball of the shuttle valve 242 is pushed by the high pressure hydrogen gas H1 from the second container 124, and the low pressure hydrogen gas H2 is unable to flow through the shuttle valve 242. This process is repeated through opening and closing the ports 112a, 112b, 114a, 114b to allow the piston 116 to continuously compress the low pressure gas G1 and discharge the compressed gas G2. This gas compression process to drive the piston 116 continues until the pressure state of the hydrogen gas in the second container 124 is lower than a predetermined threshold. Then the process returns to the gas compression process in FIG. 4, where the first container 122 releases the high pressure hydrogen gas H1.

Figure 6:
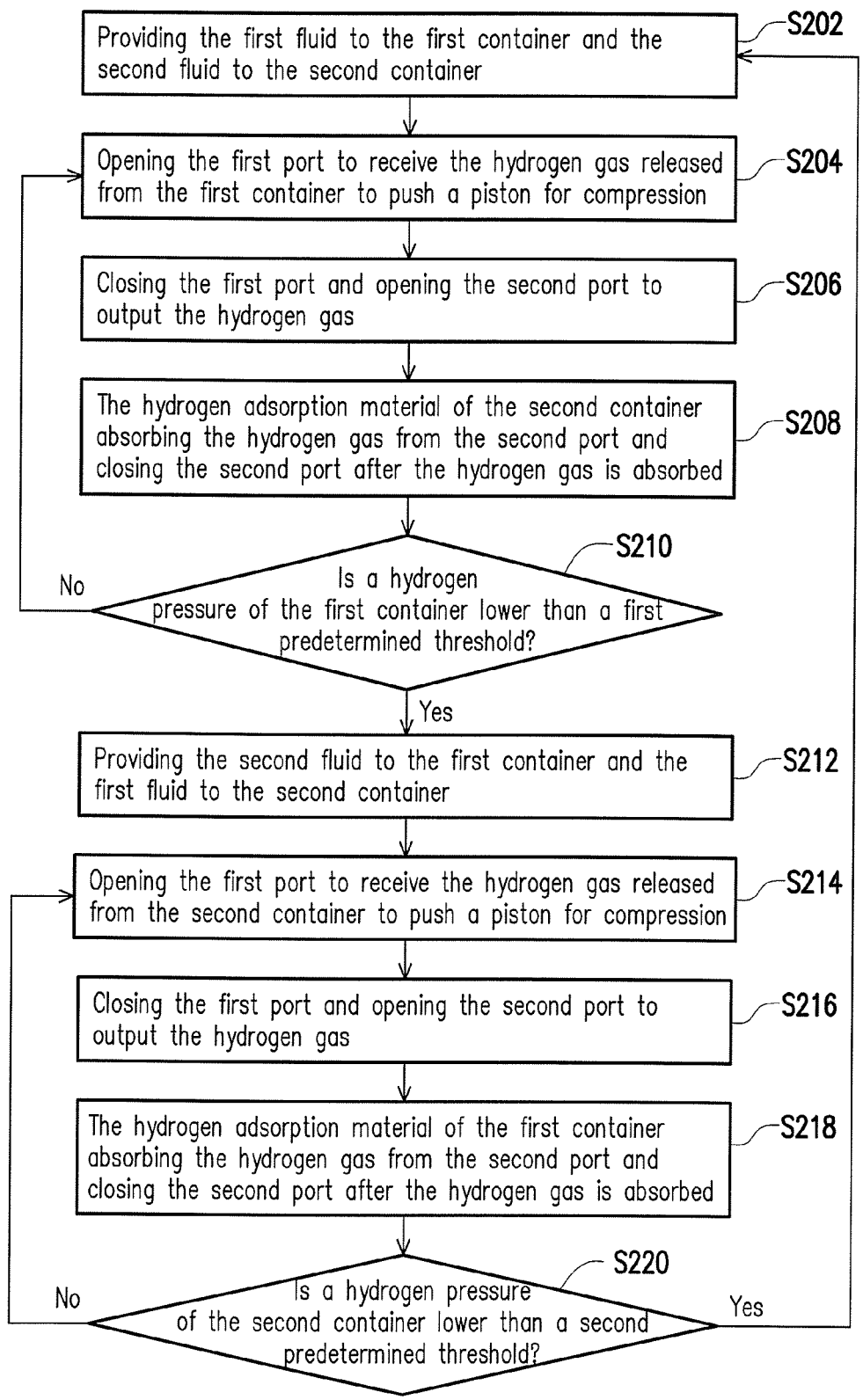
FIG. 6 is a flow chart of a method of compressing gas using the gas compression system of FIG. 4.

FIG. 6 is a flow chart of a method of compressing gas using the gas compression system of FIG. 4. The method of compressing gas by using the gas compression system 200 includes the following steps. The first fluid 130a is provided to the first container 122 to heat the hydrogen adsorption material of the first container 122 and the second fluid 130b is provided to the second container 124 with the hydrogen adsorption material to cool the hydrogen adsorption material of the second container 122 through the fluid control device 130 (step S202). The detail of how the first fluid 130a and the second fluid 130b are provided are described in the embodiment of FIG. 1, and will not be repeated herein. Furthermore, as described in the previous embodiments, the first container 122 is then adapted to release high pressure hydrogen gas H1. Next, the first port 112a is opened to receive the high pressure hydrogen gas H1 released from the first container 122 to push a piston 116 for compression (step S204). The detail of how gas is compressed by the piston 116 is described in the above embodiments, and will not be repeated herein. The detail of the first port 112a receiving the high pressure hydrogen gas H1 can be referred to in the detailed description of FIG. 4, and will not be repeated herein. Next, the first port 112a is closed and the second port 112b is opened to output the low pressure hydrogen gas H2 (step S206). Next, the low pressure hydrogen gas H2 from the second port 112b is absorbed by the hydrogen adsorption material of the second container 124, and the second port 112b is closed after the low pressure hydrogen gas H2 is absorbed (step S208). The detail of the low pressure hydrogen gas H2 being absorbed can be referred to in the detailed description of FIG. 4, and will not be repeated herein. Next, it is determined if the hydrogen pressure of the first container 122 is lower than a first predetermined threshold (step S210). If the hydrogen pressure of the first container is not lower than a first predetermined threshold, then step S204 to step S208 are repeated to drive the piston 116 to continuously compress the low pressure gas G1 into the high pressure gas G2. When a hydrogen pressure of the first container 122 is lower than a first predetermined threshold, the second fluid 130b is provided to the first container 122 to cool the hydrogen adsorption material of the first container 122 and the first fluid 130a is provided to the second container 124 to heat the hydrogen adsorption material of the second container 124 (step S212). The detail description of providing the first fluid 130a and the second fluid 130b can be referred to in the description in FIG. 2, and will not be repeated herein. Next, the first port 112a is opened to receive the high pressure hydrogen gas H1 outputted from the second container 124 to push the piston 116 for compression (step S214). The detail of the first port 112a receiving the high pressure hydrogen gas H1 can be referred to in the detailed description of FIG. 5, and will not be repeated herein. Next, the first port 112a is closed and the second port 112b is opened to output the low pressure hydrogen gas H2 (step S216). Next, the low pressure hydrogen gas H2 outputted from the second port 112b is absorbed by hydrogen adsorption material in the first container 122, and the second port 112b is closed after the low pressure hydrogen gas H2 is absorbed (step S218). The detail of the low pressure hydrogen gas H2 being absorbed can be referred to in the detailed description of FIG. 5, and will not be repeated herein. Next, it is determined if the hydrogen pressure of the second container 124 is lower than a second predetermined threshold (step S220). If the hydrogen pressure of the second container 124 is not lower than the second predetermined threshold, then step S214 to step S218 are repeated to drive the piston 116 to continuously compress the low pressure gas G1 into the high pressure gas G2. When the hydrogen pressure of the second container 124 is lower than a second predetermined threshold, the process returns to step S202 to repeat the process to step S220. The first predetermined threshold and the second predetermined threshold may be the same, or may be different according to the user.

Figure 7:
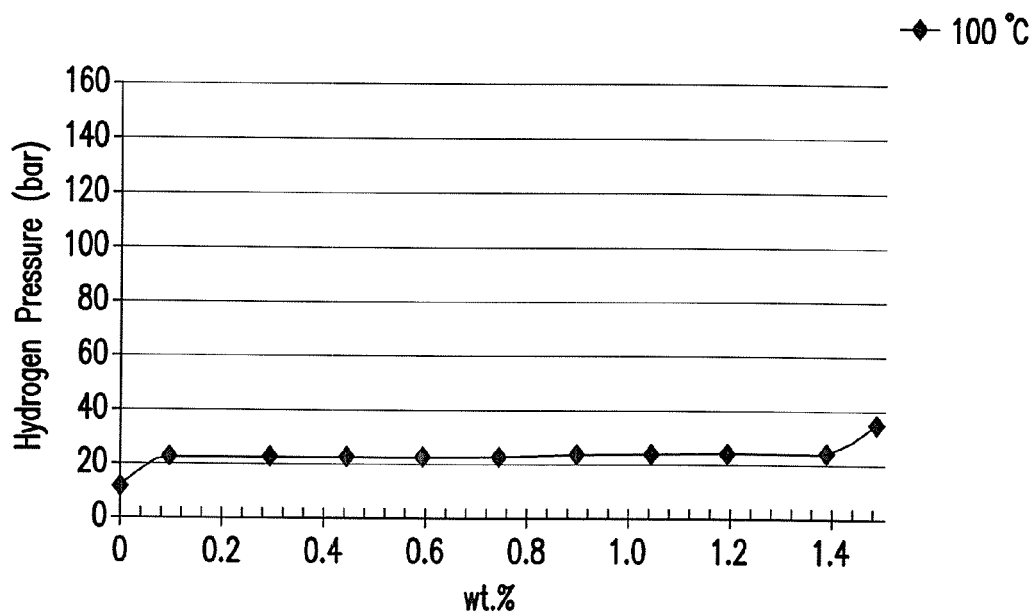
FIG. 7 is a graph of experimental results of hydrogen pressure according to another embodiment of the disclosure.

FIG. 7 is a graph of experimental results of hydrogen pressure according to another embodiment of the disclosure. The experiment is performed with the gas compression system 100. In the embodiment, the first fluid 130a is 100 degrees Celcius, and the second fluid 130b is 25 degrees Celcius. The fluid flow of the first fluid 130a and the second fluid 130b through the heat exchangers 122a, 124a of the first and second containers 122, 124 are 500 cc/min. In addition, a ratio between the surface area of the first end 116a and a surface area of the second end 116b is 6 to 1. The hydrogen adsorption material in the first and second containers 122, 124 is $LaNi_{4.7}Al_{0.3}$. The weight of the hydrogen adsorption material in each of the first and second containers 122, 124 is two kilograms. FIG. 7 shows the hydrogen pressure released by the hydrogen adsorption material in the y-axis in bars. The x-axis shows the weight percentage of the hydrogen absorbed with respect to the hydrogen adsorption material. That is, the x-axis shows the weight of the hydrogen absorbed by the hydrogen adsorption material divided by the weight of the hydrogen adsorption material, and multiplied by 100. It can be seen that at 100 degrees Celcius, the pressure of the hydrogen gas released is around 23 bars of pressure.

Figure 8:
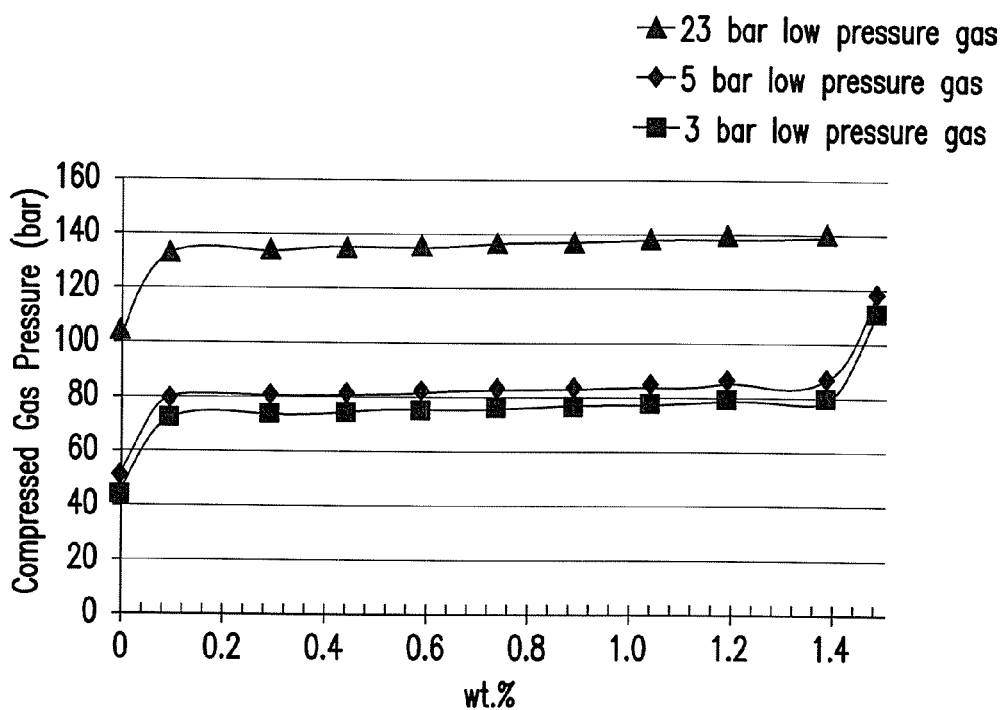
FIG. 8 is a graph of experimental results of the pressure of compressed gas according to the embodiment of FIG. 7.

FIG. 8 is a graph of experimental results of the pressure of compressed gas according to the embodiment of FIG. 7. In the embodiment, FIG. 8 shows the pressure of the compressed gas G2 as a result of the piston 116 compressing the low pressure gas G1. In the experiment, three types of low pressure gas G1 were used. The three pressures of the low pressure gasses G1 are 23 bars, 5 bars, and 3 bars. The y-axis shows the pressure of the compressed gas G2, and the x-axis shows the weight percentage of the hydrogen absorbed with respect to the hydrogen adsorption material. That is, the x-axis shows the weight of the hydrogen absorbed by the hydrogen adsorption material divided by the weight of the hydrogen adsorption material, and multiplied by 100. It can be seen that in combination with the piston 116, the low pressure gas G1 of 23 bars can be compressed up to around 138 bars of pressure. In combination with the piston 116, the low pressure gas G1 of 5 bars and 3 bars can be compressed up to around 80 bars of pressure. The experimental results of the embodiment of FIG. 7 and FIG. 8 are merely exemplary. The parameters such as the design of the piston 116, the type of the hydrogen adsorption material, and the temperature of the fluid will change the resulting pressure of the compressed gas.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A gas compression system comprising:
   a compressor, comprising a pressurizing chamber including a first port and a second port, wherein the first port is adapted for receiving a hydrogen gas and the second port is adapted for outputting the hydrogen gas;
   an adsorption device adapted to output the hydrogen gas to the first port and absorb the hydrogen gas from the second port, the adsportion device comprising:
      a first container connected to the first port or the second port of the pressurizing chamber, wherein the first container includes a hydrogen adsorption material; and
      a second container connected to the first port or the second port of the pressurizing chamber, wherein the second container includes the hydrogen adsorption material,
      wherein the hydrogen adsorption material of the first container and the second container is adapted to release the hydrogen gas when heated, and absorb the hydrogen gas when cooled; and
   a fluid control device, adapted to provide one of a first fluid through a first fluid source and a second fluid through a second fluid source to the first container and the other one of the first fluid and the second fluid to the second container, wherein a temperature of the first fluid is greater than a temperature of the second fluid.

2. The gas compression system as claimed in claim 1, wherein the compressor further comprises:
   a compression chamber including a third port for a low pressure gas to enter and be compressed and a fourth port through which a compressed gas is discharged; and
   a piston having a first end and a second end, wherein the first end of the piston is slidably mounted in the pressurizing chamber and the second end of the piston is slidably mounted in the compression chamber, and the high pressure hydrogen gas from the adsportion device pushes the first end of the piston so that the second end of the piston compresses the low pressure gas in the compression chamber.

3. The gas compression system as claimed in claim 2, wherein a surface area of the first end of the piston is greater than a surface area of the second end of the piston.

4. The gas compression system as claimed in claim 1, wherein each of the first container and the second container further comprises a heat exchanger, adapted for the first fluid or the second fluid to flow through to control a temperature of each of the first container and the second container.

5. The gas compression system as claimed in claim 4, wherein the fluid control device comprises:
   a first three way valve connected to the heat exchanger of the first container;
   a second three way valve connected to the heat exchanger of the second container;
   a first on-off valve disposed on a fluid flow path of the first fluid source to the first three way valve;
   a second on-off valve disposed on a fluid flow path of the first fluid source to the second three way valve;
   a third on-off valve disposed on a fluid flow path of the second fluid source to the second three way valve; and
   a fourth on-off valve disposed on a fluid flow path of the second fluid source to the first three way valve.

6. The gas compression system as claimed in claim 1, wherein the adsportion device further comprises a fifth on-off valve, disposed on a fluid flow path between the first container and the second container.

7. The gas compression system as claimed in claim 1, further comprising:
   a first one way valve disposed on a fluid flow path between the first container and the first port of the pressurizing chamber; and
   a second one way valve disposed on a fluid flow path between the second container and the second port of the pressurizing chamber.

8. The gas compression system as claimed in claim 1, further comprising:
   a third three way valve disposed at an inlet/outlet of the first container;
   a fourth three way valve disposed at an inlet/outlet of the second container a shuttle valve, disposed on a fluid flow path between the third three way valve, the fourth three way valve, and the first port, wherein the shuttle valve blocks fluid from passing between the third three way valve and the fourth three way valve, and allows fluid to pass between the third three way valve and the first port or the fourth three way valve and the first port;
   a third one way valve disposed on a fluid flow path between the third three way valve and the second port;
   a fourth one way valve disposed on a fluid flow path between the shuttle valve and the first port; and
   a fifth one way valve disposed on a fluid flow path between the fourth three way valve and the second port.

9. A method of compressing gas by using a gas compression system comprising a compressor, a fluid control device, a first container with a hydrogen adsorption material, and a second container with the hydrogen adsorption material, the method comprising:
   (a) providing a first fluid from a first fluid source to the first container to heat the hydrogen adsorption material of the first container and a second fluid from a second fluid source to the second container with the hydrogen adsorption material to cool the hydrogen adsorption material of the second container through the fluid control device, wherein a temperature of the first fluid is greater than a temperature of the second fluid, and the hydrogen adsorption material is adapted to release a hydrogen gas when heated and absorb the hydrogen gas when cooled;

(b) opening a first port of the compressor to receive the hydrogen gas released from the first container to push a piston for compression;

(c) closing the first port of the compressor and opening a second port of the compressor to output the hydrogen gas;

(d) absorbing the hydrogen gas from the second port of the compressor by the second container, and closing the second port after absorbing the hydrogen gas;

(e) if a hydrogen pressure of the first container is not lower than a first predetermined threshold, then repeating step (b) to step (d)

(f) when the hydrogen pressure of the first container is lower than the first predetermined threshold, providing the second fluid to the first container to cool the hydrogen adsorption material of the first container and the first fluid to the second container to heat the hydrogen adsorption material of the second container;

(g) the first container absorbing the hydrogen gas released from the second container until the hydrogen pressure of the first container is higher than a second predetermined threshold; and (h) repeating step (a) to step (h).

10. The method as claimed in claim 9, wherein each of the first container and the second container further comprises a heat exchanger, adapted for the first fluid or the second fluid to flow through to control a temperature of each of the first container and the second container.

11. The method as claimed in claim 10, wherein the fluid control device comprises:
 a first three way valve connected to the heat exchanger of the first container;
 a second three way valve connected to the heat exchanger of the second container;
 a first on-off valve disposed on a fluid flow path of the first fluid source to the first three way valve;
 a second on-off valve disposed on a fluid flow path of the first fluid source to the second three way valve;
 a third on-off valve disposed on a fluid flow path of the second fluid source to the second three way valve; and
 a fourth on-off valve disposed on a fluid flow path of the second fluid source to the first three way valve.

12. The method as claimed in claim 11, wherein in step (a):
 the first on-off valve is opened and the second on-off valve is closed to provide the first fluid to the first container through the first on-off valve and the first three way valve,
 the third on-off valve is opened and the fourth on-off valve is closed to provide the second fluid to the second container through the third on-off valve and the second three way valve.

13. The method as claimed in claim 11, wherein in step (f):
 the first on-off valve is closed and the second on-off valve is opened to provide the first fluid to the second container through the second on-off valve and the second three way valve,
 the third on-off valve is closed and the fourth on-off valve is opened to provide the second fluid to the first container through the fourth on-off valve and the first three way valve.

14. The method as claimed in claim 9, wherein in step (g), the first container absorbs the hydrogen gas released from the second container by opening a fifth on-off valve disposed on a fluid flow path between the first container and the second container.

15. The method as claimed in claim 9, wherein the gas compression system further comprises:
 a first one way valve is disposed on a fluid flow path between the first container and the first port of the compressor so that the hydrogen gas flows through the first one way valve to the first port and is blocked by the first one way valve from flowing back into the first container; and
 a second one way valve disposed on a fluid flow path between the second container and the second port of the compressor so that the hydrogen gas flows through the second one way valve to the second container and is blocked by the second one way valve from flowing back into the compressor.

16. The method as claimed in claim 9, wherein the compressor comprises:
 a compression chamber including a third port for a low pressure gas to enter and be compressed and a fourth port through which a compressed gas is discharged;
 a pressurizing chamber including the first port and the second port; and
 the piston having a first end and a second end, wherein the first end of the piston is slidably mounted in the pressurizing chamber and the second end of the piston is slidably mounted in the compression chamber,
 wherein in step (b), the hydrogen gas received in the first port pushes the first end of the piston so that the second end of the piston compresses the low pressure gas in the compression chamber.

17. A method of compressing gas by using a gas compression system comprising a compressor, a fluid control device, a first container with a hydrogen adsorption material, and a second container with the hydrogen adsorption material, the method comprising:
 (a) providing a first fluid from a first fluid source to the first container to heat the hydrogen adsorption material of the first container and a second fluid from a second fluid source to the second container with the hydrogen adsorption material to cool the hydrogen adsorption material of the second container through the fluid control device, wherein a temperature of the first fluid is greater than a temperature of the second fluid, and the hydrogen adsorption material is adapted to release a hydrogen gas when heated and absorb the hydrogen gas when cooled;
 (b) opening a first port of a compressor to receive the hydrogen gas released from the first container to push a piston for compression;
 (c) closing the first port of the compressor and opening a second port of the compressor to output the hydrogen gas;
 (d) absorbing the hydrogen gas from the second port of the compressor by the second container, and closing the second port after absorbing the hydrogen gas;
 (e) if a hydrogen pressure of the first container is not lower than a first predetermined threshold, then repeating step (b) to step (d);
 (f) when a hydrogen pressure of the first container is lower than a first predetermined threshold, providing the second fluid to the first container to cool the hydrogen adsorption material of the first container and the first fluid to the second container to heat the hydrogen adsorption material of the second container;

(g) opening the first port of a compressor to receive the hydrogen gas outputted from the second container to push the piston for compression;

(h) closing the first port of the compressor and opening the second port of the compressor to output the hydrogen gas;

(i) absorbing the hydrogen gas from the second port of the compressor by the first container, and closing the second port after absorbing the low pressure hydrogen gas;

(j) if a hydrogen pressure of the second container is not lower than a second predetermined threshold, then repeating step (g) to step (i); and (k) when the hydrogen pressure of the second container is lower than the second predetermined threshold, returning to step (a) and repeating step (a) to step (k).

18. The method as claimed in claim 17, wherein each of the first container and the second container further comprises a heat exchanger, adapted for the first fluid or the second fluid to flow through to cool or heat each of the first container and the second container.

19. The method as claimed in claim 18, wherein the fluid control device comprises:
a first three way valve connected to the heat exchanger of the first container;
a second three way valve connected to the heat exchanger of the second container;
a first on-off valve disposed on a fluid flow path of the first fluid source to the first three way valve;
a second on-off valve disposed on a fluid flow path of the first fluid source to the second three way valve;
a third on-off valve disposed on a fluid flow path of the second fluid source to the second three way valve; and
a fourth on-off valve disposed on a fluid flow path of the second fluid source to the first three way valve.

20. The method as claimed in claim 19, wherein in step (a):
the first on-off valve is opened and the second on-off valve is closed to provide the first fluid to the first container through the first on-off valve and the first three way valve,
the third on-off valve is opened and the fourth on-off valve is closed to provide the second fluid to the second container through the third on-off valve and the second three way valve.

21. The method as claimed in claim 19, wherein in step (f):
the first on-off valve is closed and the second on-off valve is opened to provide the first fluid to the second container through the second on-off valve and the second three way valve,
the third on-off valve is closed and the fourth on-off valve is opened to provide the second fluid to the first container through the fourth on-off valve and the first three way valve.

22. The method as claimed in claim 17, wherein the gas compression system further comprises:
a third three way valve connected to an inlet/outlet of the first container;
a fourth three way valve connected to an inlet/outlet of the second container
a shuttle valve, disposed on a fluid flow path between the third three way valve, the fourth three way valve, and the first port, wherein the shuttle valve blocks fluid from passing between the third three way valve and the fourth three way valve, and allows fluid to pass between the third three way valve and the first port or the fourth three way valve and the first port;
a first one way valve disposed on a fluid flow path between the third three way valve and the second port;
a second one way valve disposed on a fluid flow path between the shuttle valve and the first port; and
a third one way valve disposed on a fluid flow path between the fourth three way valve and the second port.

23. The method as claimed in claim 22, wherein in step (b) the hydrogen gas from the first container passes through the third three way valve and the shuttle valve and the second one way valve to enter the first port of the compressor, the hydrogen gas is blocked from entering the second port by the first one way valve and is blocked from entering the the fourth three way valve by the shuttle valve, and the second one way valve blocks the hydrogen gas from flowing back to the third three way valve.

24. The method as claimed in claim 23, wherein in step (d), the hydrogen gas outputted from the second port enters the fourth three way valve through the third one way valve to be absorbed in the second container, the hydrogen gas is blocked from entering the third three way valve by the first one way valve that is pushed by the hydrogen gas from the first container, and is blocked by the third one way valve from flowing back to the second port.

25. The method as claimed in claim 22, wherein in step (g), the hydrogen gas from the second container passes through the fourth three way valve and the shuttle valve and the second one way valve to enter the first port of the compressor, the hydrogen gas is blocked from entering the second port by the first one way valve and is blocked from entering the the third three way valve by the shuttle valve, and the second one way valve blocks the hydrogen gas from flowing back to the fourth three way valve.

26. The method as claimed in claim 25, wherein in step (i), the hydrogen gas outputted from the second port enters the third three way valve through the first one way valve to be absorbed in the first container, the hydrogen gas is blocked from entering the fourth three way valve by the third one way valve that is pushed by the hydrogen gas released from the second container, and is blocked by the first one way valve from flowing back to the second port.

* * * * *